(No Model.)

C. SHARP & G. CONSENE.
THILL COUPLING.

No. 429,871. Patented June 10, 1890.

Witnesses

Inventors
CHARLES SHARP
GEORGE CONSENE
by Baldwin Davidson & Wight
Attorneys

United States Patent Office.

CHARLES SHARP AND GEORGE CONSENE, OF MEXICO, NEW YORK.

THILL-COUPLING.

SPECIFICATION forming part of Letters Patent No. 429,871, dated June 10, 1890.

Application filed December 12, 1889. Serial No. 333,482. (No model.)

*To all whom it may concern:*

Be it known that we, CHARLES SHARP and GEORGE CONSENE, citizens of the United States, residing at Mexico, in the county of Oswego and State of New York, have jointly invented certain new and useful Improvements in Thill-Couplings, of which the following is a specification.

The object of our invention is to provide a thill-coupling both strong and durable and in which the shafts may be readily removed from the coupling when they are not in use.

Our invention also has for its object devices for securely connecting the shafts to the couplings, permitting them to turn freely on their pivots, and yet preventing them from rattling.

Thill-couplings have heretofore been constructed in which the coupling-irons on the rear ends of the shafts have been slotted and mounted on pivot-bolts on the clip, and in which springs are interposed between the clip and the coupling-irons; but our invention consists in an improved way of connecting the coupling-irons to the clips, and in an improved form of spring, and in the manner of connecting the springs to the clips.

Figure 1:
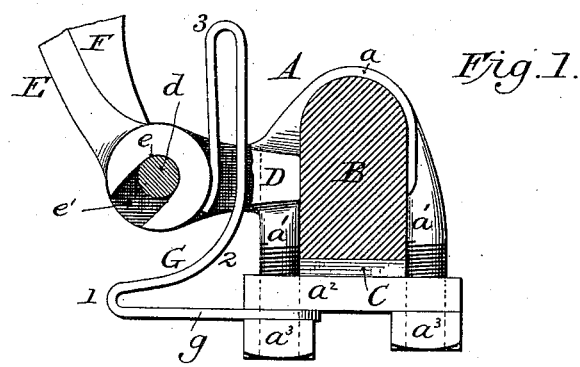
Figure 2:
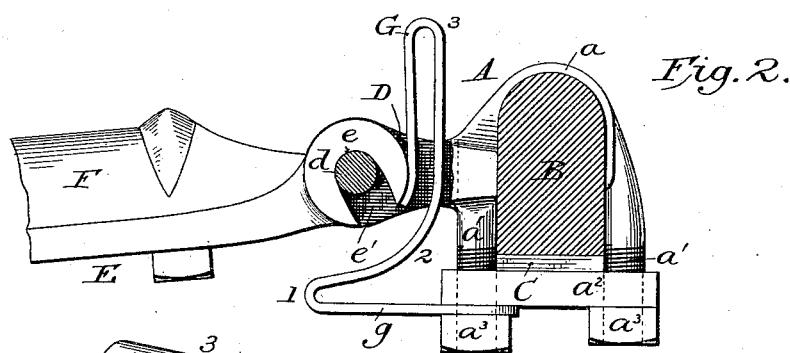
Figure 3:
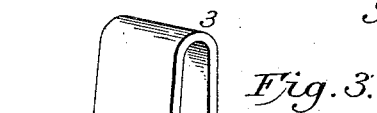
Figure 4:
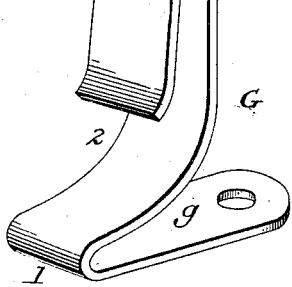

In the accompanying drawings, Figure 1 is a side elevation of a clip on an axle, which is shown in section, and of the rear end of a shaft connected to the clip and with our improvements applied. Fig. 2 is a similar view showing the several parts in a different position, and Figs. 3 and 4 show details of the construction.

We will describe one of the clips with the connected parts, it being understood that there are two clips, one on each end of the axle. The clip A is shown as consisting of a strap $a$, extending over the axle B, and having screw-threaded downwardly-projecting ends $a'$, on which is mounted a bottom plate $a^2$, connecting the two downwardly-projecting ends $a'$. Between the plate $a^2$ and the axle B is preferably interposed a plate C, extending parallel with the axle B. Nuts $a^3$ fit the screw-threaded ends $a'$ and secure the strap and the plates to the axle. At its front end the clip is provided with forwardly-projecting arms D. A pivot-pin $d$ connects the arms at their outer ends. The coupling-iron E, which is secured to the rear end of the shaft F, is formed with a socket $e$, adapted to fit the pin $d$, and the slot $e'$ extends from the socket $e$ to the outside, thus forming a kind of hook, which may be readily passed over the pin $d$. The socket $e$ is preferably curved on its opposite sides as well as its upper end, as shown, and closely fits the pin $d$, so that in backing as well as in drawing forward there is no movement of the coupling-iron relatively to the pin.

When the shafts are in the position shown in Fig. 1, the vehicle may be drawn forward or backed without separation; but the shafts may be removed from the clips by lifting them vertically, so that the pin $d$ passes through the slot $e'$.

In order to prevent the shafts from shaking loose or becoming separated when not positively moved for that purpose, we provide a spring G of an especial form and better adapted for that purpose than any other form of spring with which we are acquainted. This form of spring, as will be seen, has approximately a figure 2 form. The horizontal base-piece $g$ is secured at its rear end to the clip by means of the front downwardly-extending end $a'$ and the nuts $a^3$, which clamp the rear ends of the plate $g$ to the under side of the cross-piece $a^2$. The bottom piece $g$ extends forwardly beneath the pin $d$, then upwardly and backwardly in a curved line in rear of the pin $d$, then upwardly above the pin, and at the top is bent over, and then extends downwardly to bear against the rear end of the coupling-iron E. The end which bears against the rear end of the coupling-iron is preferably made to conform thereto, so that the spring-pressure is applied in the most efficient manner. As will be seen, this form of spring, while strong and durable, gives a spring-pressure which is best adapted for holding the coupling-iron to the clip. The bend of the spring at the point 1 and along the line 2 co-operates with the bend at 3 to afford a yielding pressure that securely holds the coupling-iron to the pin, but which acts to throw the iron off from the pin when the shafts are depressed and in position to be removed.

While thill-couplings organized in some respects similarly to ours have been heretofore patented, we believe that there are in all of them objections which our invention overcomes.

The spring in our device may be applied to the usual form of coupling. It is only necessary to cut or drill out the slot $e'$ in the usual form of coupling-iron in order that our improvements may be embodied in any usual form of thill-coupling.

We claim as of our own invention—

1. The combination, substantially as hereinbefore set forth, of the clip having the forwardly-projecting arms, the pivot-pin $d$, the coupling-iron E, having the socket $e$, curved on its upper end and curved or concaved on its opposite sides, as described, in which the pin fits closely, and a slot $e'$, extending therefrom, and the spring secured at its lower end to the clip and so bent as to extend upwardly between the arms of the clip in rear of the pivot-pin and doubled or bent over at the top and projecting downwardly and resting against the coupling-iron.

2. The combination, substantially as hereinbefore set forth, of the clip having a strap extending over the axle and downwardly-projecting ends, the cross-plate connecting the downwardly-projecting ends of the clip, nuts clamping the plate to the under side of the axle, the forwardly-projecting arms of the clip, the pivot-pin connecting their outer ends, the slotted coupling-piece on the rear end of the shaft, and the figure 2 spring having a horizontal base-piece $g$ extending forwardly beneath the pivot-pin and beyond it, a rearwardly and upwardly extending portion behind the pivot-pin, and a return or downwardly-projecting end resting against the rear end of the coupling-iron.

In testimony whereof we have hereunto subscribed our names.

CHARLES SHARP.
GEORGE CONSENE.

Witnesses:
T. W. SKINNER,
J. W. HUNTINGTON.